United States Patent
Naka et al.

(10) Patent No.: US 7,969,957 B2
(45) Date of Patent: Jun. 28, 2011

(54) INTERLEAVE APPARATUS AND INTERLEAVE METHOD

(75) Inventors: Katsuyoshi Naka, Kanagawa (JP); Daichi Imamura, Kanagawa (JP); Tomohiro Imai, Kanagawa (JP); Junya Yamazaki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1014 days.

(21) Appl. No.: 11/722,144

(22) PCT Filed: Dec. 8, 2005

(86) PCT No.: PCT/JP2005/022570
§ 371 (c)(1),
(2), (4) Date: Jun. 19, 2007

(87) PCT Pub. No.: WO2006/067972
PCT Pub. Date: Jun. 29, 2006

(65) Prior Publication Data
US 2009/0092118 A1    Apr. 9, 2009

(30) Foreign Application Priority Data

Dec. 21, 2004  (JP) ................................. 2004-369683

(51) Int. Cl.
*H04J 1/00* (2006.01)
(52) U.S. Cl. .......................... 370/343; 370/203; 375/260
(58) Field of Classification Search .......... 370/203–208, 370/338; 375/260–265; 714/748
See application file for complete search history.

(56) References Cited

U.S. PATENT DOCUMENTS

| 7,430,215 B2 * | 9/2008 | Arivoli et al. ................. 370/430 |
| 2001/0199846 | 10/2001 | Matsumoto et al. |
| 2004/0199846 A1 * | 10/2004 | Matsumoto et al. .......... 714/748 |
| 2004/0233836 A1 | 11/2004 | Sumasu et al. |
| 2004/0240409 A1 | 12/2004 | Mantha et al. |
| 2006/0195756 A1 | 8/2006 | Yoshii |

FOREIGN PATENT DOCUMENTS

JP   2001-332980   11/2001

(Continued)

OTHER PUBLICATIONS

PCT International Search Report dated Mar. 14, 2006.

(Continued)

*Primary Examiner* — Ricky Ngo
*Assistant Examiner* — Kan Yuen
(74) *Attorney, Agent, or Firm* — Dickinson Wright PLLC

(57) ABSTRACT

An interleave apparatus and an interleave method for preventing an increase in the number of retransmissions to improve the throughput. In a wireless communication apparatus having the interleave apparatus, a data holding part (1021) two-dimensionally arranges and holds bit sequences. A first index calculating part (1022) sequentially calculates first indexes to be used for reading, in a column direction, the bit sequences arranged in a row direction. A second index calculating part (1023) sequentially calculates second indexes to be used for reversing the order of the upper-order and lower-order bits to be read from the even-numbered columns when the bit sequences are read in accordance with the first indexes. A third index calculating part (1024) sequentially calculates third indexes to be used for reading the bit sequences from a different start position in accordance with the number of retransmissions. A reading part (1025) reads the bit sequences in the order that is in accordance with the third indexes. A mapping part (103) maps the read bit sequences to the respectively corresponding subcarriers.

2 Claims, 10 Drawing Sheets

FOREIGN PATENT DOCUMENTS

| | | |
|---|---|---|
| JP | 2003 283460 | 10/2003 |
| JP | 2003 309535 | 10/2003 |
| JP | 2004-104574 | 4/2004 |
| JP | 2004 112471 | 4/2004 |
| JP | 2004 304268 | 10/2004 |
| JP | 2004 537238 | 12/2004 |

OTHER PUBLICATIONS

Notice of the Reasons for Rejection dated Jul. 20, 2010.
"IEEE Wireless LAN Edition—A compilation based on IEEE Std. 802.11TM 1999 (R2003) and its amendments" IEEE, New York, Standard IEEE 802.11, Nov. 2003, pp. 1-678, p. 2, line 18.

* cited by examiner

| MODULATION SCHEME | $N_{BPSC}$ | s |
|---|---|---|
| BPSK | 1 | 1 |
| QPSK | 2 | 1 |
| 16QAM | 4 | 2 |
| 64QAM | 6 | 3 |

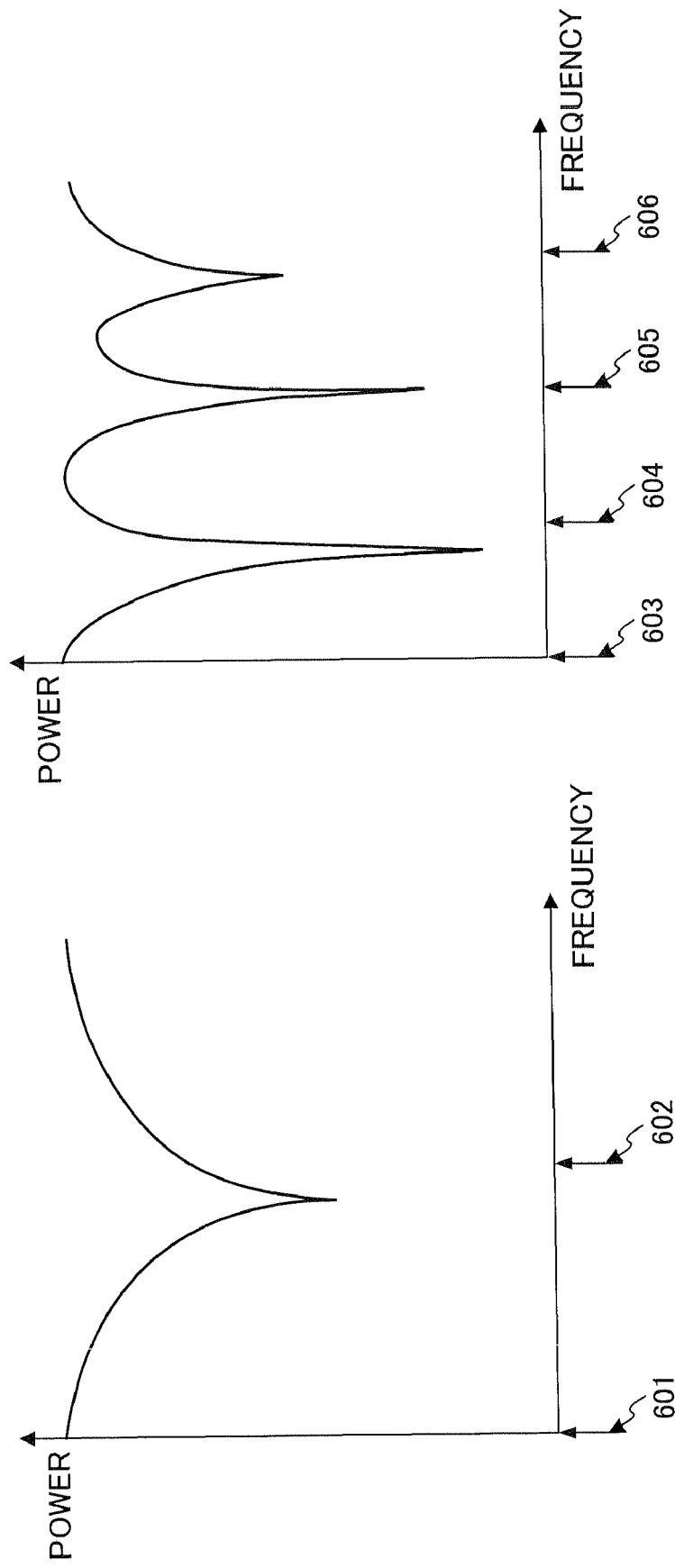

INTERLEAVE APPARATUS AND INTERLEAVE METHOD

TECHNICAL FIELD

The present invention relates to an interleave apparatus and an interleave method, and more particularly, an interleave apparatus and an interleave method for interleaving data multicarrier-transmitted by a plurality of carriers whose center frequencies are different from each other.

BACKGROUND ART

In wireless LAN (Local Area Network) complying with the IEEE (Institute of Electrical and Electronics Engineers) 802.11a and 802.11g standards which have been actively studied in recent years, OFDM (Orthogonal Frequency Division Multiplexing) modulation is adopted as a radio transmission scheme.

The OFDM modulation is a technique for increasing frequency utilization efficiency and realizing high-speed data transmission by transmitting data using a plurality of subcarriers which are orthogonal each other.

Further, an OFDM symbol obtained by the OFDM modulation is less subject to the influence of frequency selective fading. This is because, in the OFDM symbol, data is mapped to a plurality of subcarriers having different frequencies, and therefore transmission quality of only data mapped to a part of subcarriers deteriorates due to the frequency selective fading.

In addition, as disclosed, for example, in non-patent document 1, by using the OFDM modulation and bit interleaving in combination, it is possible to correct errors in bits of subcarriers where transmission quality deteriorates due to the frequency selective fading, and further suppress the influence of the frequency selective fading. That is, by preventing consecutive bits from being mapped to the same subcarrier on the transmitting side, even if erroneous bits occur due to the frequency selective fading, the receiving side can perform error correction from preceding and following bits mapped to other subcarriers where transmission quality is good.

Non-patent document 1: "IEEE Wireless LAN Edition—A compilation based on IEEE Std. 802.11TM 1999(R2003) and its amendments" IEEE, New York, Standard IEEE 802.11, November 2003.

DISCLOSURE OF INVENTION

Problems to be Solved by the Invention

When transmission quality of specific subcarriers substantially deteriorates due to the frequency selective fading, a sufficient error correction rate cannot be achieved even if the receiving side performs error correction, and retransmission of data may be required. However, if the frequency selective fading characteristics do not change between first transmission and retransmission, bits which had an error are mapped again to subcarriers where transmission quality is poor upon retransmission, and therefore the retransmission efficiency becomes poor.

Specifically, when an OFDM symbol is transmitted on a propagation path having frequency selective fading as shown in FIG. 1, a reception power of subcarriers near frequency $f_1$ falls drastically due to frequency selective fading, and a sufficient error rate cannot be achieved for bit group 10 mapped to subcarriers near frequency $f_1$. As a result, the receiving side requests retransmission of data, but bit group 10 is mapped to subcarriers near frequency $f_1$ again when retransmitted. Bit group 10 is less likely to be received correctly until the frequency selective fading characteristics change, and therefore the number of retransmissions increases.

It is therefore an object of the present invention to provide an interleave apparatus and an interleave method capable of preventing an increase in the number of retransmissions and improving throughput.

Means for Solving the Problem

The interleave apparatus according to the present invention adopts a configuration having: a holding section that holds a bit stream which is comprised of a plurality of bits and written in a writing order where the plurality of bits are arranged in a two-dimensional array; a reading out section that reads out the plurality of bits from the held bit stream in an order different from the writing order; a transmission section that maps the read out plurality of bits to a plurality of carriers having different frequencies in the reading out order and transmits the bits; and a retransmission control section that counts the number of retransmissions requested for the transmitted plurality of bits, wherein the reading out section changes a start position of the reading out order according to the number of retransmissions.

The interleave method according to the present invention has: a holding step of holding a bit stream which is comprised of a plurality of bits and written in a writing order where the plurality of bits are arranged in a two-dimensional array; a reading out step of reading out the plurality of bits from the held bit stream in an order different from the writing order; a transmission step of mapping the read out plurality of bits to a plurality of carriers having different frequencies in the reading out order and transmitting the bits; and a retransmission control step of counting the number of retransmissions requested for the transmitted plurality of bits, wherein the reading out step changes a start position of the reading out order according to the number of retransmissions.

Accordingly, a start position of the reading out order of the bit streams held in a two-dimensional array changes for each retransmission, and the read out bits are mapped to a plurality of subcarriers and transmitted sequentially. As a result, the same bits are mapped to different subcarriers for each retransmission, and the propagation characteristics of the subcarriers transmitting the bits change for each retransmission. It is therefore possible to average the error rate of bits held in the two-dimensional array. As a result, it is possible to prevent an increase in the number of retransmissions and improve throughput.

Advantageous Effect of the Invention

According to the present invention, it is possible to prevent an increase in the number of retransmissions and improve throughput.

BRIEF DESCRIPTION OF THE DRAWINGS

FIG. 3 shows an example of variables decided according to modulation schemes;

FIG. 5 shows an example of a reading out order of bits decided according to a second index;

FIG. 6 shows an example of a reading out order of bits decided according to a third index;

FIG. 10A shows an example of start position candidates; and

FIG. 10B further shows an example of start position candidates.

BEST MODE FOR CARRYING OUT THE INVENTION

Embodiments of the present invention will be described in detail below with reference to the accompanying drawings.

Embodiment 1

Figure 1:
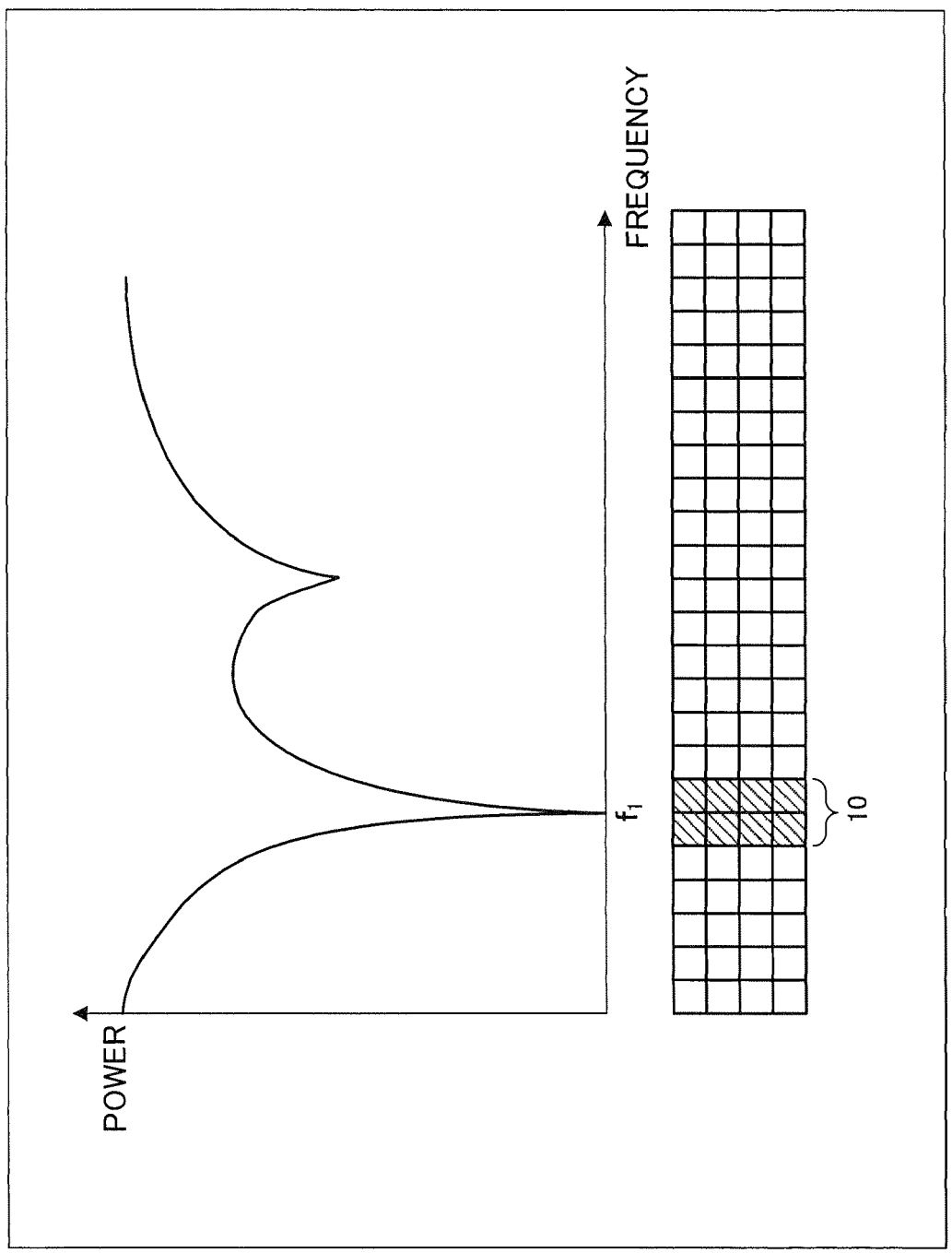
FIG. 1 shows an example of frequency selective fading.
Figure 2:
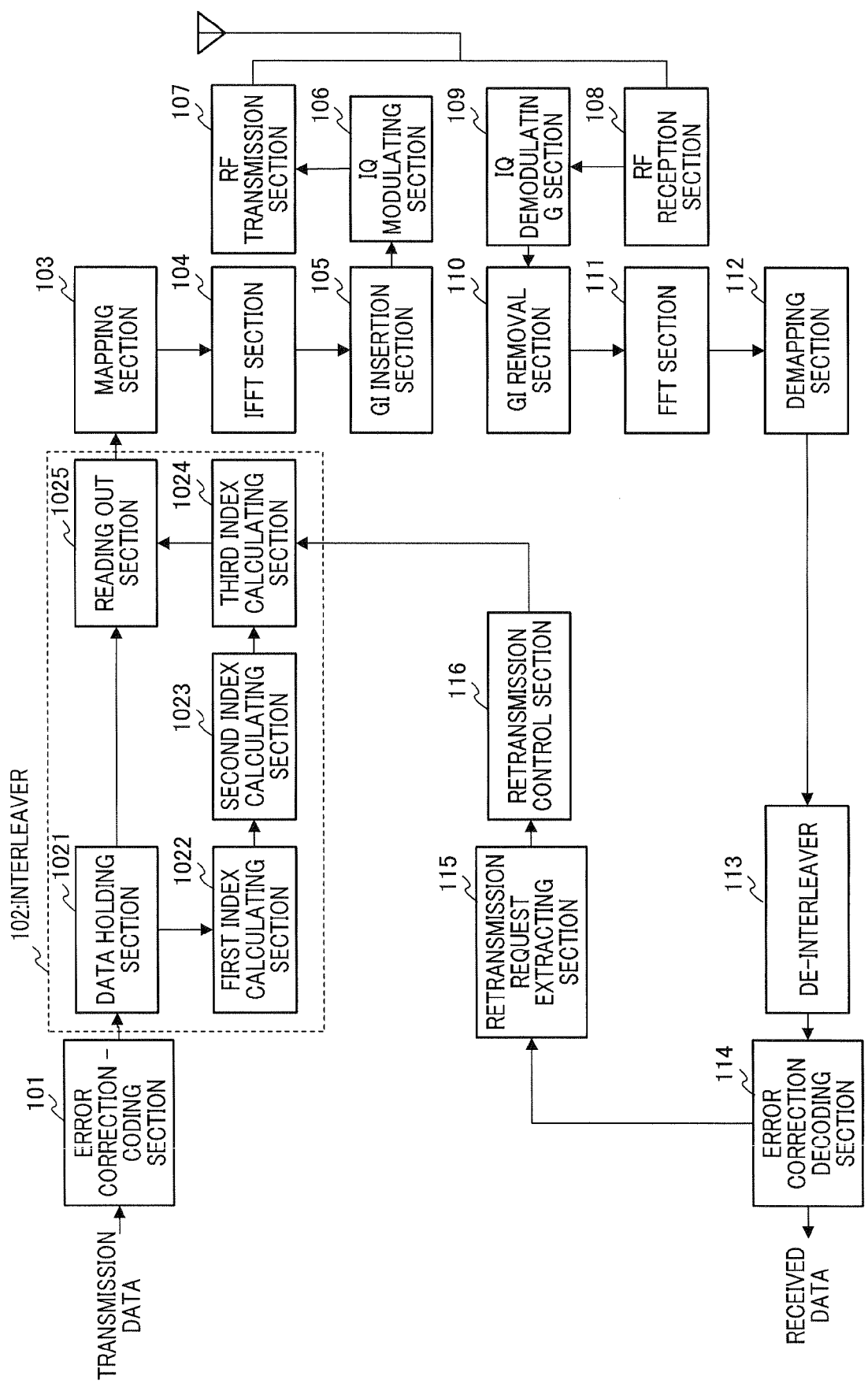
FIG. 2 is a block diagram showing a configuration of a radio communication apparatus according to Embodiment 1 of the present invention.

FIG. 2 is a block diagram showing a configuration of the radio communication apparatus provided with the interleave apparatus according to Embodiment 1 of the present invention. The radio communication apparatus shown in FIG. 2 has error correction encoding section 101, interleaver 102, mapping section 103, IFFT (Inverse Fast Fourier Transform) section 104, GI (Guard Interval) insertion section 105, IQ (In-phase Quadrature) modulating section 106, RF (Radio Frequency) transmission section 107, RF reception section 108, IQ demodulating section 109, GI removing section 110, FFT (Fast Fourier Transform) section 111, demapping section 112, de-interleaver 113, error correction decoding section 114, retransmission request extracting section 115 and retransmission control section 116.

Further, interleaver 102 has data holding section 1021, first index calculating section 1022, second index calculating section 1023, third index calculating section 1024 and reading out section 1025.

Error correcting encoding section 101 performs error correction encoding on transmission data, and sequentially outputs bit streams obtained through error correction encoding to interleaver 102.

Interleaver 102 rearranges the order of the bit streams obtained through error correction encoding and outputs the result to mapping section 103.

Specifically, data holding section 1021 arranges and holds the bit streams outputted from error correction encoding section 101 in two dimensions. At this time, data holding section 1021 writes bits to be mapped to one OFDM symbol in a predetermined number of rows and columns and holds the bits. Specifically, data holding section 1021 writes bits by repeatedly arranging a predetermined number of bits (for example, 16) in each row in a row direction (lateral direction) from the leading bit of the bit stream. Data holding section 1021 then takes the writing order of the bits as an index. That is, for example, when sixteen bits are arranged in each row in a row direction, an index for a leading bit of the first row is taken to be "0", an index for a final bit of the first row is taken to be "15", an index for a leading bit of the second row is taken to be "16", and an index for a final bit of the second row is taken to be "31".

First index calculating section 1022 sequentially calculates first indexes for reading out the bit streams arranged in a row direction at data holding section 1021 in a column direction (vertical direction). That is, in the case of the example described above, first index calculating section 1022 calculates first index "0" for a bit of index "0", and calculates a first index "1" for a bit of index "16". Namely, first index calculating section 1022 calculates first index i from the following equation 1 using index k for each bit and total number of bits $N_{CBPS}$ held in data holding section 1021 and total number of columns c.

$$i = (N_{CBPS}/c)(k \bmod c) + \text{floor}(k/c) \quad \text{(Equation 1)}$$

$$k = 0, 1, \ldots, N_{CBPS} - 1$$

where, in equation 1, "mod" is remainder operation, and "(k mod c)" is a remainder when index k is divided by total number of columns c. Further, "floor" is a floor function, and "floor (k/c)" is the maximum integral number not exceeding a quotient when index k is divided by total number of columns c.

Second index calculating section 1023 sequentially calculates second indexes for reversing the order of higher bits and lower bits read out from the columns of even number while reading out bit streams held in data holding section 1021 according to the first indexes Namely, in the above-described case, if, for example, second index calculating section 1023 reads out bits held in the second column according to the first indexes, bits are read out in the order of index "1" (first index "12") and "17" (first index "13"), and, if second index calculating section 1023 reads out bits according to the second indexes, bits are read out in the order of index "17" and "1". Namely, second index calculating section 1023 calculates second index j from the following equation 2 using total number of bits $N_{CBPS}$ held in data holding section 1021 and total number of columns c.

$$j = s \times \text{floor}(i/s) + (i + N_{CBPS} - \text{floor}(c \times i/N_{CBPS})) \bmod s \quad \text{(Equation 2)}$$

$$i = 0, 1, \ldots, N_{CBPS} - 1$$

Here, in equation 2, $s = \max(N_{BPSC}/2, 1)$, and $N_{BPSC}$ is the number of bits transmitted using one symbol according to the modulation scheme. Here, $N_{BPSC}$ and s for the case where the modulation scheme is BPSK, QPSK, 16 QAM and 64 QAM are respectively as shown in FIG. 3.

Third index calculating section 1024 sequentially calculates third indexes for reading out bit streams held in data holding section 1021 from different start positions (columns) according to the number of retransmissions. Namely, in the case of the above-described example, third index calculating section 1024, for example, calculates third index "0" for a bit of index "0" (second index "0") upon the first transmission, and calculates third index "0" for a bit of index "4" (second index "48") upon the first retransmission. That is, third index calculating section 1024 calculates third index m from the following equation 3 using second index j, number of retransmissions r, column intervals $c_d$ between different start position candidates, total number of bits $N_{CBPS}$ held in data holding section 1021 and total number of columns c.

$$m=(((\text{floor}(c/c_d)-r_p)\text{mod}(\text{floor}(c/c_d)))\times c_d\times N_{CBPS}/c+j)\\ \text{mod } N_{CBPS} \quad \text{(Equation 3)}$$

$$r_p=r\text{ mod}(\text{floor}(c/c_d))$$

$$j=0,1,\ldots,N_{CBPS}-1$$

In equation 3, when $c/c_d$ is an integer number, start position candidates are evenly arranged all over the two-dimensional array of the bits, and therefore an effect of averaging the error rate becomes the highest. Further, by defining $r_p$ from number of retransmissions r, the order in which each start position candidate becomes a start position is cyclical, and the effect of averaging the error rate increases. Therefore, in equation 3, even when number of retransmissions r is used as is in stead of $r_p$, it is possible to read out bits from start positions which are different for each number of retransmissions.

Further, when ACK is received from the receiving side, third index calculating section 1024 need not retransmit bit streams held in data holding section 1021, and therefore instructs reading out section 1025 to read out and discard the bit streams held in data holding section 1021. Calculation of first indexes, second indexes and third indexes will be described later in detail using the specific example.

Reading out section 1025 reads out bit streams held in data holding section 1021 in the order according to third indexes and outputs the bit streams to mapping section 103. Further, when ACK is received from the receiving side, reading out section 1025 reads out and discards the bit streams held in data holding section 1021 according to the instruction from third index calculating section 1024.

Mapping section 103 maps the bitstreams outputted from interleaver 102 to the corresponding subcarriers.

IFFT section 104 performs inverse fast Fourier transform on the bit streams mapped to the subcarriers and generates an OFDM symbol.

GI insertion section 105 duplicates an end portion of the OFDM symbol to be putted at the head and inserts guard intervals.

IQ modulating section 106 IQ modulates the guard-interval inserted OFDM symbol for each subcarrier and outputs the obtained OFDM signal to RF transmission section 107.

RF transmission section 107 performs predetermined radio transmission processing (such as D/A conversion and up-conversion) on the OFDM signal and transmits the result via an antenna.

RF reception section 108 receives the OFDM signal which is transmitted from the receiving side and includes ACK or NACK, and performs predetermined radio reception processing (such as down-conversion and A/D conversion).

IQ demodulating section 109 IQ demodulates the received signal for each subcarrier and outputs the obtained OFDM symbol to GI removing section 110.

GI removing section 110 removes guard intervals from the OFDM symbol.

FFT section 111 performs fast Fourier transform on the guard-interval removed OFDM symbol, and outputs bit streams of each subcarrier to demapping section 112.

Demapping section 112 de-maps the bit streams of each subcarrier outputted from FFT section 111.

De-interleaver 113 rearranges the order of the bit streams so that interleaving by the interleaver on the receiving side is undone. Namely, when the apparatus communicates with a radio communication apparatus having the same configuration as the apparatus, de-interleaver 113 calculates the third indexes, the second indexes, the first index, and the original index, in that order so that interleaving by interleaver 102 is undone. Specifically, de-interleaver 113 carries out the reverse operation of the above-described equations 1 to 3 using the following equations 4 to 6, and calculates third index m, second index j, first index i, and original index k, in that order.

$$j=((r\text{ mod}(\text{floor}(c/c_d)))\times c_d\times N_{CBPS}/c+m)\text{mod }N_{CBPS} \quad \text{(Equation 4)}$$

$$i=s\times\text{floor}(j/s)+(j+\text{floor}(c\times j/N_{CBPS}))\text{mod }s \quad \text{(Equation 5)}$$

$$k=c\times i-(N_{CBPS}-1)\text{floor}(c\times i/N_{CBPS}) \quad \text{(Equation 6)}$$

Error correction decoding section 114 performs error correction decoding on the de-interleaved bit streams, outputs the received data, and outputs ACK or NACK to retransmission request extracting section 115.

If the output from error correction decoding section 114 is ACK, retransmission request extracting section 115 reports to retransmission control section 116 that retransmission is not requested from the receiving side, and, if output of error correction decoding section 114 is NACK, reports to retransmission control section 116 that retransmission is requested from the receiving side.

Retransmission control section 116 calculates the number of retransmissions based on the report from retransmission request extracting section 115, and, if retransmission is not requested, reports it to third index calculating section 1024 and ensures that the bit streams held in data holding section 1021 are discarded, and, if retransmission is requested, reports the number of retransmissions to third index calculating section 1024. Here, the number of retransmissions is the number of times the same transmission data is retransmitted, and is equal to the number of times NACK is consecutively received. Namely, if ACK is received from the receiving side after transmission of given data, the next data is then newly transmitted, but if NACK is received for this data, the first retransmission is carried out, and the number of retransmissions is 1. Further, after the first retransmission, if NACK is received again, the second retransmission is carried out, and the number of retransmissions becomes 2.

Next, interleave operation for data transmitted by a radio communication apparatus according to this embodiment will be described with reference to FIG. 4 to FIG. 7 using a specific example. In the following, the operation for after receiving an OFDM signal which is transmitted from the receiving side and includes ACK or NACK will be described.

RF reception section 108 performs predetermined radio reception processing on the OFDM signals received via the antenna, IQ demodulating section 109 IQ demodulates the OFDM signals, and GI removing section 110 removes guard intervals. FFT section 111 performs fast Fourier transform on the guard-interval removed OFDM symbol, and demapping section 112 de-maps the bit streams of each subcarrier.

De-interleaver 113 deinterleaves the bit streams obtained by demapping so as to undo interleaving by the interleaver provided on the receiving side. Therefore, when the receiving side is a radio communication apparatus having the same configuration as the apparatus, deinterleaving is performed using the above-described equations 4 to 6 so as to undo the interleaving by interleaver 102. Error correction decoding section 114 performs error correction decoding on the deinterleaved bit streams, outputs the received data, and outputs ACK or NACK to retransmission request extracting section 115.

Retransmission request extracting section 115 determines whether or not output from error correction decoding section 114 is ACK or NACK. When the output is ACK, the signals transmitted from the apparatus are correctly received at the receiving side, and therefore retransmission request extracting section 115 reports to retransmission control section 116 that retransmission is not requested. Further, when the output of error correction decoding section 114 is NACK, the signals transmitted from the apparatus are not correctly received at the receiving side, and therefore retransmission request extracting section 115 reports to retransmission control section 116 that retransmission is requested.

When retransmission is not requested, retransmission control section 116 reports it to third index calculating section 1024, and, when retransmission is requested, reports the number of retransmissions to third index calculating section 1024.

When retransmission is not requested, third index calculating section 1024 instructs reading out section 1025 to read out and discard the bit streams held in data holding section 1021, and reading out section 1025 discards the bit streams held in data holding section 1021. After this, new transmission data is transmitted for the first time.

On the other hand, when retransmission is requested (upon retransmission request), third index calculating section calculates third indexes different from those of the last transmission, and reading out section 1025 reads out the bit streams held in data holding section 1021 in the order of the third indexes, and transmission data is retransmitted.

In the following, the interleaving by interleaver 102 upon first transmission or upon retransmission request.

Figure 4:
FIG. 4 shows an example of a reading out order of bits decided according to a first index.

Error correction encoding section 101 performs error correction encoding on the transmission data upon first transmission, and outputs the obtained bit streams to data holding section 1021 within interleaver 102. The bit streams are arranged in two dimensions and held in data holding section 1021, and the bit streams at this time are written by arranging, for example, 16 bits in each row in a row direction (lateral direction) as shown by the solid line arrow in FIG. 4. The order of the bit streams written in data holding section 1021 is the index of each bit. Namely, for example, an index for a bit of the first column of the first row is "0", an index for a bit of the sixteenth column of the first row is "15", and an index for a bit of the first column of the second row is "16". Further, the total number of bits held at the same time in data holding section 1021 is equal to the number of bits transmitted using one OFDM symbol, and FIG. 4 shows an example of the case where 192 bits of index "0" to "191" are transmitted using one OFDM symbol. When the total number of bits held at the same time increases or decreases, data holding section 1021 holds the bits by increasing or decreasing the number of rows (12 in FIG. 4).

When the bit streams are held in data holding section 1021, first, first index calculating section 1022 calculates first indexes. The first indexes are calculated by the above-described equation 1, and, for example, in the example shown in FIG. 4, equation 1 becomes as shown in the following equation 7.

$$i=(192/16)(k \bmod 16)+\text{floor}(k/16) \quad \text{(Equation 7)}$$

$$k=0,1,\ldots,191$$

If first index i is calculated by substituting index k in equation 7, first index i becomes larger in the order shown by the dotted arrow of FIG. 4. Namely, first index "0", "1", . . . "190", "191" are calculated for bits of indexes "0", "16", . . . "175", "191" arranged in a column direction in the order from the first column.

The calculated first indexes are outputted to second index calculating section 1023, and the second indexes are then calculated by second index calculating section 1023. The second indexes are calculated from the above-described equation 2, and, for example, in the example shown in FIG. 4, equation 2 becomes as shown in the following equation 8.

$$j=s\times\text{floor}(i/s)+(i+192-\text{floor}(16\times i/192)) \bmod s \quad \text{(Equation 8)}$$

$$i=0,1,\ldots,191$$

Further, if, for example, the modulation scheme of IQ modulating section 106 is 16 QAM, from FIG. 3, s=2, and therefore equation 8 becomes as shown in the following equation 9.

$$j=2\times\text{floor}(i/2)+(i+192-\text{floor}(16\times i/192)) \bmod 2 \quad \text{(Equation 9)}$$

Figure 5:
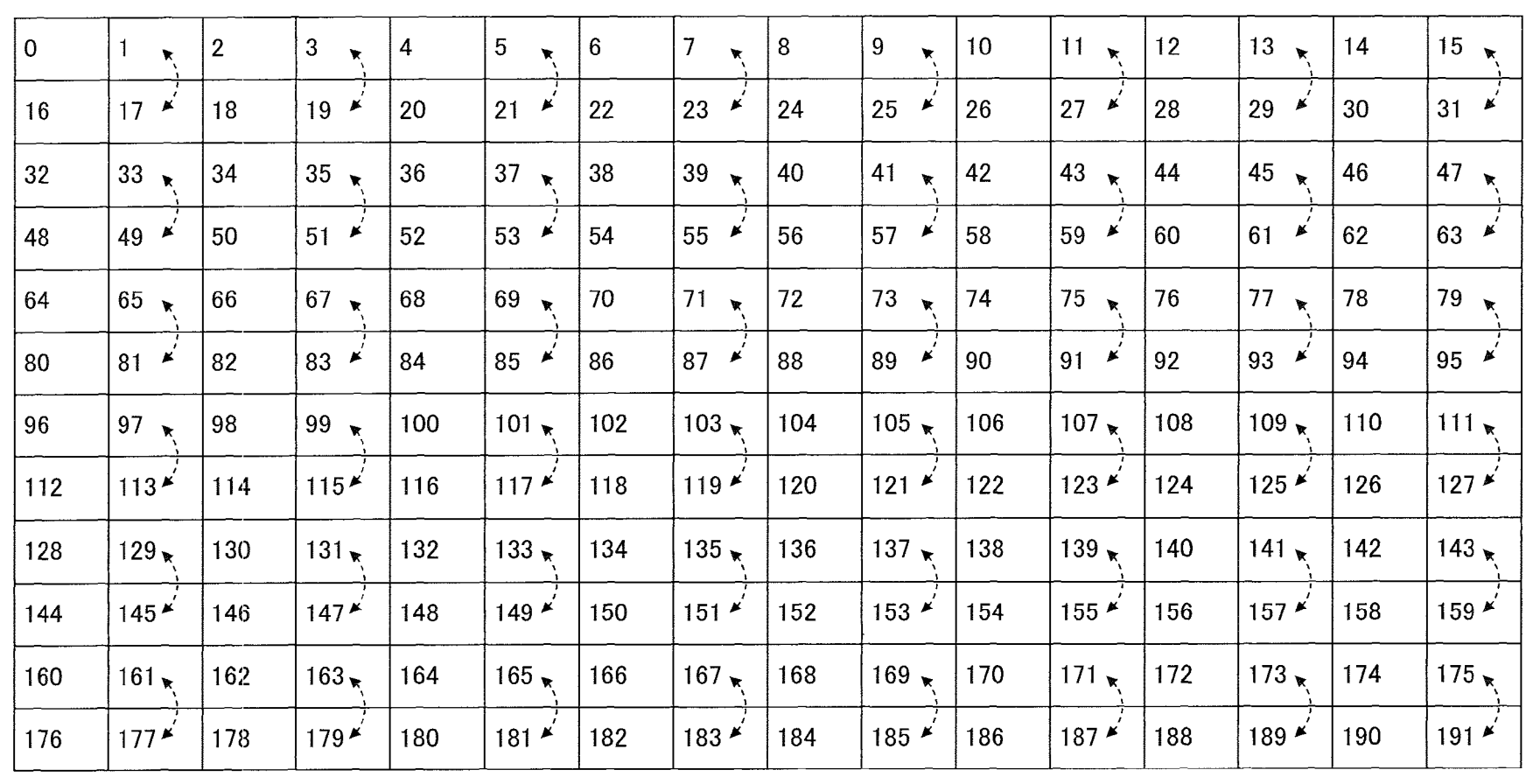

If second index j is calculated by substituting first index i in equation 9, as shown by the dotted arrow of FIG. 5, in even columns, the magnitude of second indexes for bits in odd rows and neighboring even rows are reversed as shown by the dashed arrow of FIG. 5. Namely, second indexes "0", "1", . . . , "190", "191" are calculated for bits of the first indexes "0" (index "0"), "1" (index "1"), . . . , "191" (index "191"), "190" (index "175").

In equation 9, the modulation scheme at IQ modulating section 106 is taken to be 16 QAM, but in the case of modulation using 16 QAM, bits for odd rows become higher bits where errors are less likely to occur upon demodulation, and bits for even rows become lower bits where errors are likely to occur upon demodulation. By calculating second indexes, bits of higher bits and lower bits are reversed in half of the columns (even columns), and it is possible to always make errors less likely to occur in bits for indexes "16" to "31" in the second row, for example, than bits for indexes "0" to "15" in the first row. Namely, it is possible to prevent errors from occurring in consecutive bits. The above-described operation up to the calculation of the second indexes is carried out only upon the first transmission, and upon retransmission request, the following third indexes are calculated from the second indexes calculated upon the first transmission.

The calculated second indexes are outputted to third index calculating section 1024, and the third indexes are then calculated by third index calculating section 1024. The third indexes are calculated from the above-described equation 3, and, for example, in the example shown in FIG. 4, equation 3 becomes as shown in the following equation 10.

$$m=(((\text{floor}(16/c_d)-r_p)\bmod(\text{floor}(16/c_d)))\times c_d\times 12+j) \bmod 192 \quad \text{(Equation 10)}$$

$$r_p=r \bmod(\text{floor } 16/c_d)$$

$$j=0,1,\ldots,191$$

Further, when the start positions for reading out the bit streams move to the rear by four columns according to the number of retransmissions, for example, $C_d=4$, and therefore equation 10 becomes as shown in the following in equation 11.

$$m=(((4-r_p)\bmod 4)\times 4\times 12+j)\bmod 192 \quad \text{(Equation 11)}$$

$$r_p=r \bmod 4$$

Here, when the first transmission is carried out, number of retransmissions r is 0, and third index m is equal to second index j. Third index m is outputted to reading out section 1025 and the bit streams held in data holding section 1021 are read out in the order from bits of the third index "0" by reading out section 1025. Namely, reading out section 1025 reads out the bit streams from start position 201 shown in FIG. 6 in the order of the dotted arrow.

Figure 6:
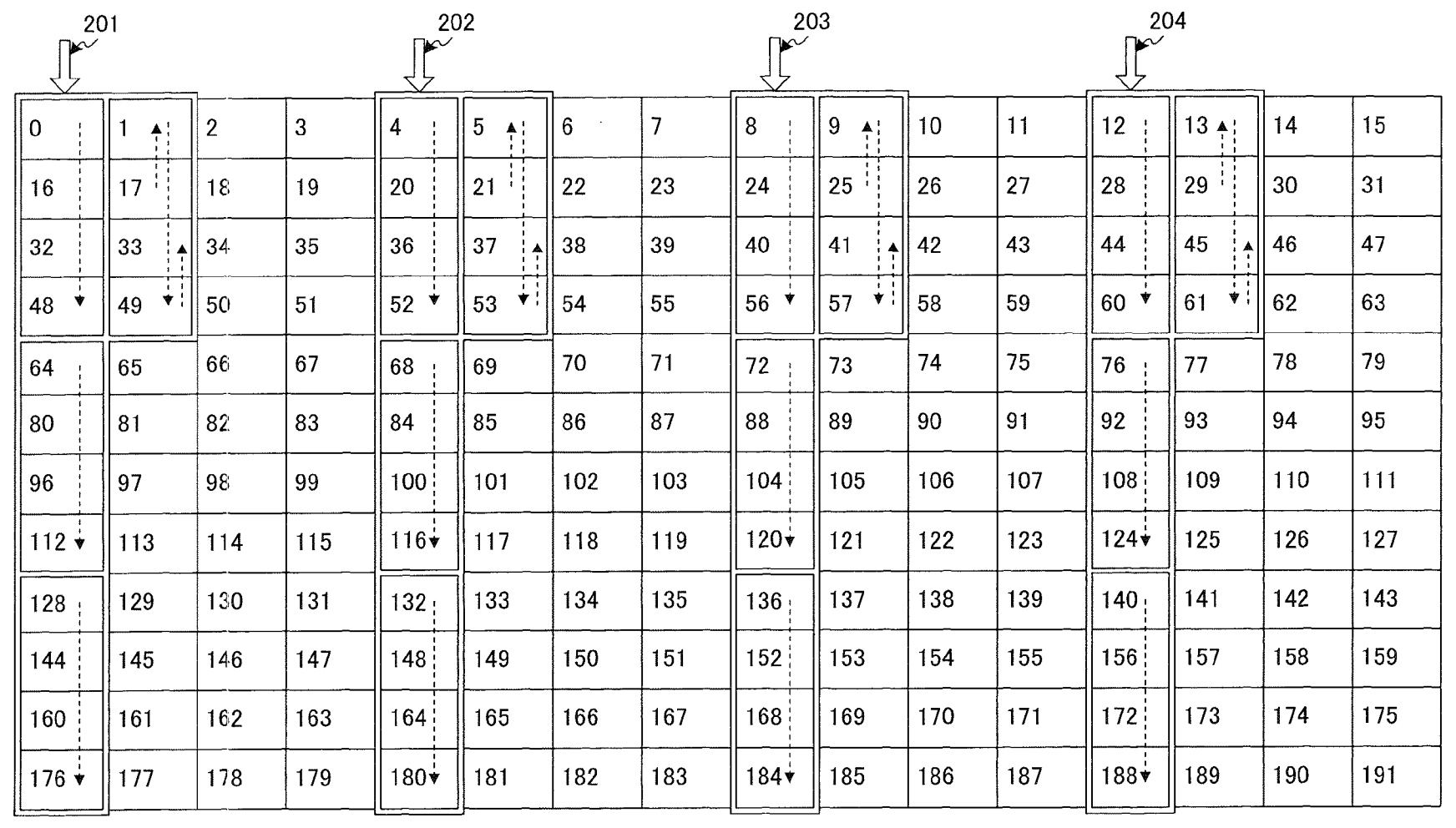

Further, when first retransmission is carried out, number of retransmissions r is 1, the bit of the second index "48" (index "4") then becomes the third index "0", and bit streams are read out in the order of the dotted arrow from start position 202 shown in FIG. 6 by reading out section 1025.

Similarly, when second retransmission is carried out, number of retransmissions r is 2, the bit of the second index "96" (index "8") then becomes the third index "0", and bit streams are read out in the order of the dotted arrow from start position 203 shown in FIG. 6 by reading out section 1025.

When third retransmission is carried out, number of retransmissions r is 3, the bit of the second index "144" (index "12") then becomes the third index "0", and the bit streams are read out in the order of the dotted arrow from start position 204 shown in FIG. 6 by reading out section 1025.

The bit streams read out from the start position according to the number of retransmissions in this way are then outputted to mapping section 103, and four bits surrounded by a double-frame in FIG. 6 are mapped to one subcarrier. Here, IQ modulating section performs 16 QAM modulation, and therefore four bits surrounded by a double-frame in FIG. 6 form one symbol and mapped to the same subcarrier.

Figure 7A:
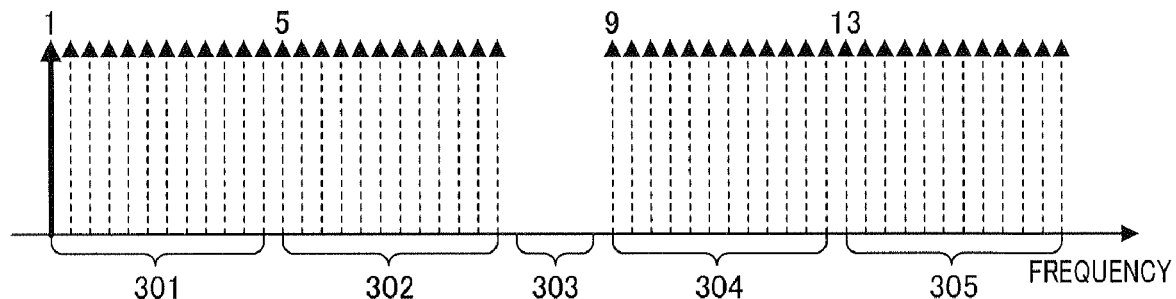
FIG. 7A shows an example of mapping upon first transmission.

Therefore, upon the first transmission, as shown in FIG. 7A, 48 bits in the first to fourth columns in FIG. 6 are mapped to subcarrier group 301, 48 bits in the fifth to eighth columns in FIG. 6 are mapped to subcarrier group 302, 48 bits in the ninth to twelfth columns in FIG. 6 are mapped to subcarrier group 304 except subcarrier group 303 for control data, and 48 bits in the thirteenth to sixteenth columns in FIG. 6 are mapped to subcarrier group 305.

Figure 7B:
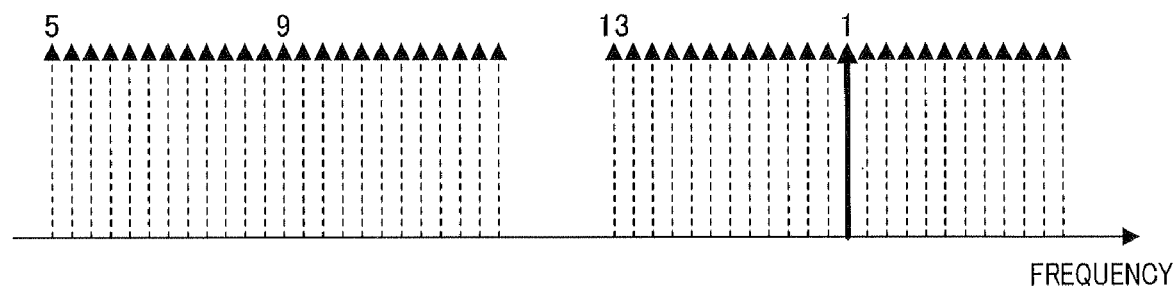
FIG. 7B shows an example of mapping upon first retransmission.

On the other hand, upon the first retransmission, as shown in FIG. 7B, bits in the fifth to ninth columns in FIG. 6 are mapped to subcarrier group 301, bits in the ninth to twelfth columns in FIG. 6 are mapped to subcarrier group 302, bits in the thirteenth to sixteenth columns in FIG. 6 are mapped to subcarrier group 304, and bits in the first to fourth columns in FIG. 6 are mapped to subcarrier group 305.

Figure 7C:
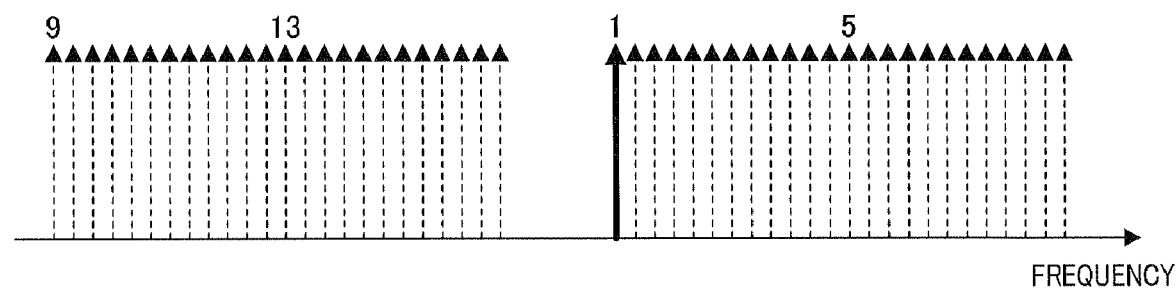
FIG. 7C shows an example of mapping upon second retransmission.
Figure 7D:
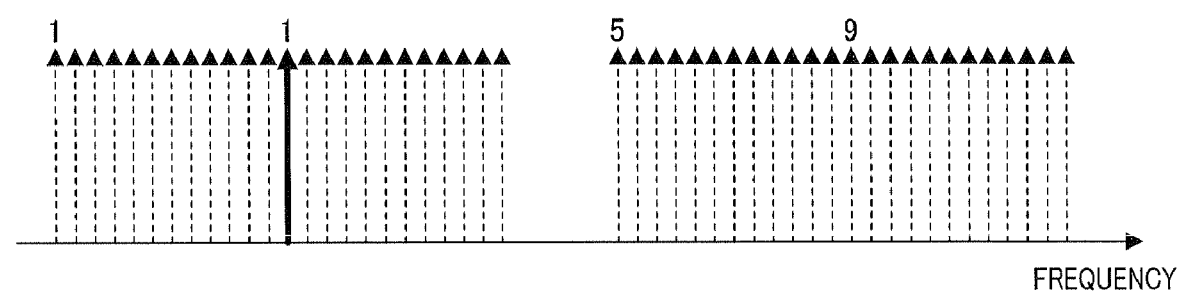
FIG. 7D shows an example of mapping upon third retransmission.

In the same way, upon the second and third retransmissions, as shown in FIG. 7C and FIG. 7D, respectively, different bits are mapped to subcarrier groups 301 to 305. Namely, by calculating the third indexes according to the number of retransmissions, the same bits are mapped to different subcarriers for each retransmission. As a result, even if the characteristics of the frequency selective fading do not change, propagation characteristics of the subcarriers transmitting the bits change for each retransmission, and the reception power of the subcarriers transmitting the same bits do not always fall, so that it is possible to prevent an increase in the number of retransmissions.

When the bits are mapped to subcarriers, IFFT section 104 performs inverse fast Fourier transform, and GI insertion section 105 inserts guard intervals in a generated OFDM symbol. IQ modulating section 106 IQ modulates the guard-interval inserted OFDM symbol for each subcarrier, and RF transmission section 107 performs predetermined transmission processing and transmits the OFDM symbol via an antenna.

As described above, according to this embodiment, the start positions of reading out bit streams held in the interleaver change according to the number of retransmissions, and therefore the same bits are mapped to different subcarriers for each retransmission, and the propagation characteristics of the subcarriers transmitting the bits change for each retransmission, so that it is possible to prevent an increase in the number of retransmissions and improve throughput.

In this embodiment, the case has been described where the total number of columns is 16 as the interleaver size, the modulation scheme is 16 QAM, and the start position candidates for reading out according to the number of retransmissions are set at four positions at four column intervals, but the present invention can be implemented by variously changing the interleaver size, modulation scheme and start position candidates.

Embodiment 2

A feature of Embodiment 2 of the present invention is that in two consecutive transmissions (for example, first retransmission and second retransmission), start positions for reading out the bit streams from the interleaver are made significantly different, and subcarriers to which the same bits are mapped upon retransmissions are made further distant from each other.

Figure 8:
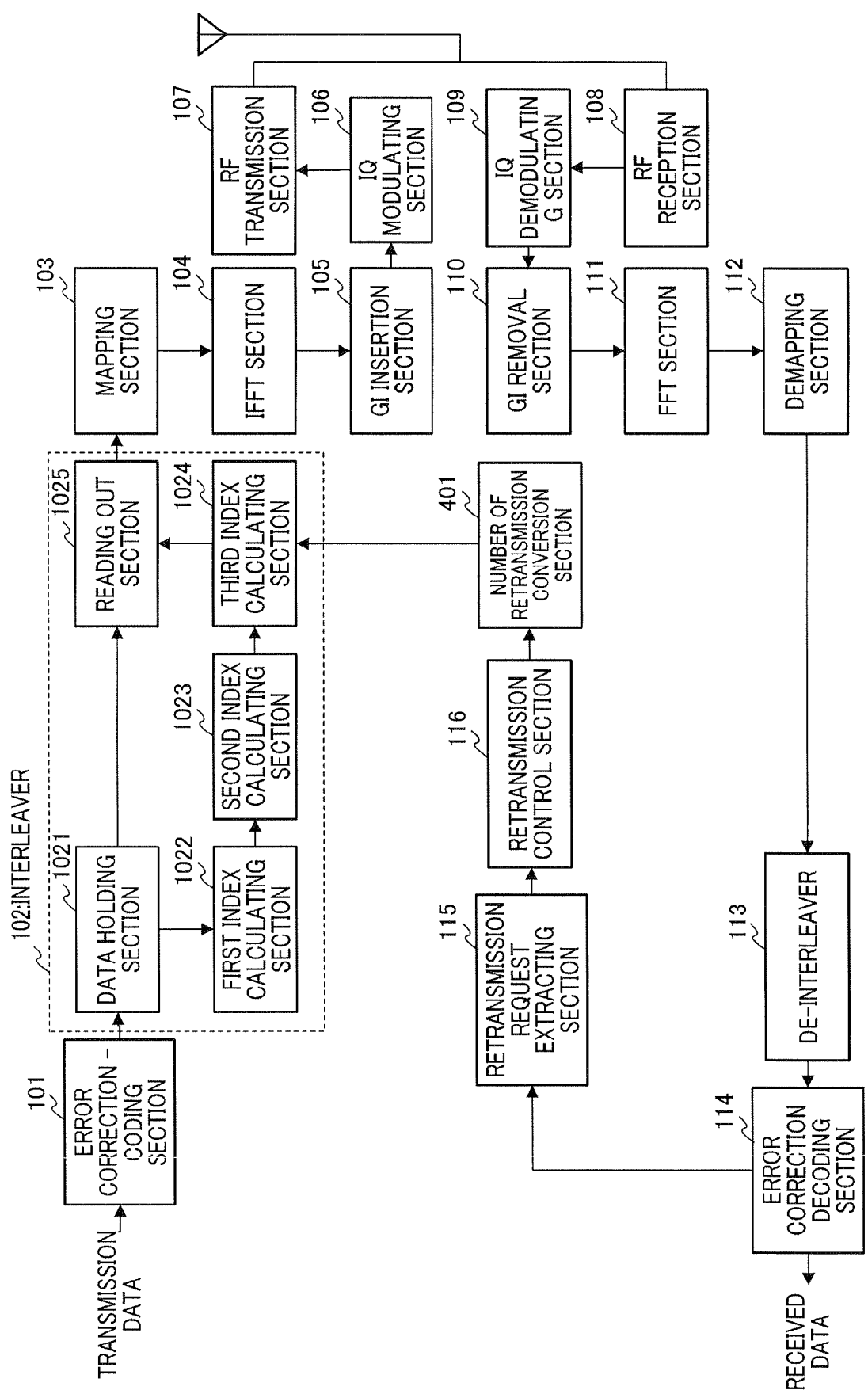
FIG. 8 is a block diagram showing a configuration of a radio transmission apparatus according to Embodiment 2 of the present invention.

FIG. 8 is a block diagram showing a configuration of a radio communication apparatus provided with an interleave apparatus according to this embodiment. In the same drawing, parts that are the same as those in FIG. 2 will be assigned the same reference numerals without further explanations. The radio communication apparatus shown in FIG. 8 has number-of-retransmission conversion section 401 in addition to the radio communication apparatus of FIG. 2.

Number-of-retransmission conversion section 401 converts the number of retransmissions reported from retransmission control section 116 and outputs the converted number of retransmissions to third index calculating section 1024. Specifically, number-of-retransmission conversion section 401 converts the number of retransmissions so that the start positions of reading out bit streams held in data holding section 1021 are as distant as possible from that upon the previous transmission.

In this embodiment, for example, from total number of columns c of the bit streams held in data holding section 1021 and column interval $c_d$ between different start positions, the number of candidates which may be start positions is $c/c_d$, but this number of candidates is equally divided into x to form groups of start position candidates, and the converted number of retransmissions r' is calculated from number of retransmissions r using the following equation 12 so that one start position candidate of each group becomes the start position in turn.

$$r'=(1/x)\times(r \bmod(\text{floor}(c/c_d)))+(\text{floor}(c/c_d)-1)(r \bmod x)) \quad \text{(Equation 12)}$$

In the example which is similar to Embodiment 1, total number of columns c=16, column interval $c_d$=4, and here, considering the case of equally dividing four start position candidates (first column, fifth column, ninth column and thirteenth column) into two (that is, x=2), from equation 12, if r=0, r'=0, if r=1, then r'=2, if r=2, then r'=1, and, if r=3, then r'=3. Number-of-retransmission conversion section 401 converts the number of retransmissions to 2 upon the first retransmission, converts the number of retransmissions to 1 upon the second retransmission, and outputs the number of retransmissions different from the actual number of retransmissions to third index calculating section 1024.

Third index calculating section 1024 calculates third indexes, but in this embodiment, the number of retransmissions is converted, and therefore the first column becomes a start position upon the first transmission, the ninth column becomes a start position upon the first retransmission, the fifth column becomes a start position upon the second retransmission, and the thirteenth column becomes a start position upon the third retransmission. As a result, compared to Embodiment 1, the frequencies of the subcarriers to which the same bits are mapped become substantially distant for each retransmission, and a greater frequency diversity effect can be obtained.

In equation 12, start position candidates are equally divided into x, and therefore in transmission of the first x times including the first transmission, the start position candidates of different groups become start positions for each time, and therefore the average frequency diversity effect in x times becomes a maximum. Accordingly, it is possible to decide x from the average number of retransmissions required until one OFDM symbol is correctly received on the receiving side by referring to the past retransmission situations. Namely, it is possible to decide x so that the average frequency diversity effect in the average number of retransmissions required until one OFDM symbol is correctly received becomes a maximum.

As described above, according to this embodiment, the number of transmissions changes, and starting points of reading out change so that the frequencies of subcarriers to which the same bits are mapped become substantially different from the previous transmission, so that the frequencies of subcarriers transmitting the same bits are substantially distant for each retransmission, and a frequency diversity effect can be obtained. As a result, it is possible to further reliably prevent an increase in the number of retransmissions.

Embodiment 3

A feature of Embodiment 3 of the present invention is that start points where bit streams are read out from the interleaver are decided according to frequency selective fading characteristics.

Figure 9:
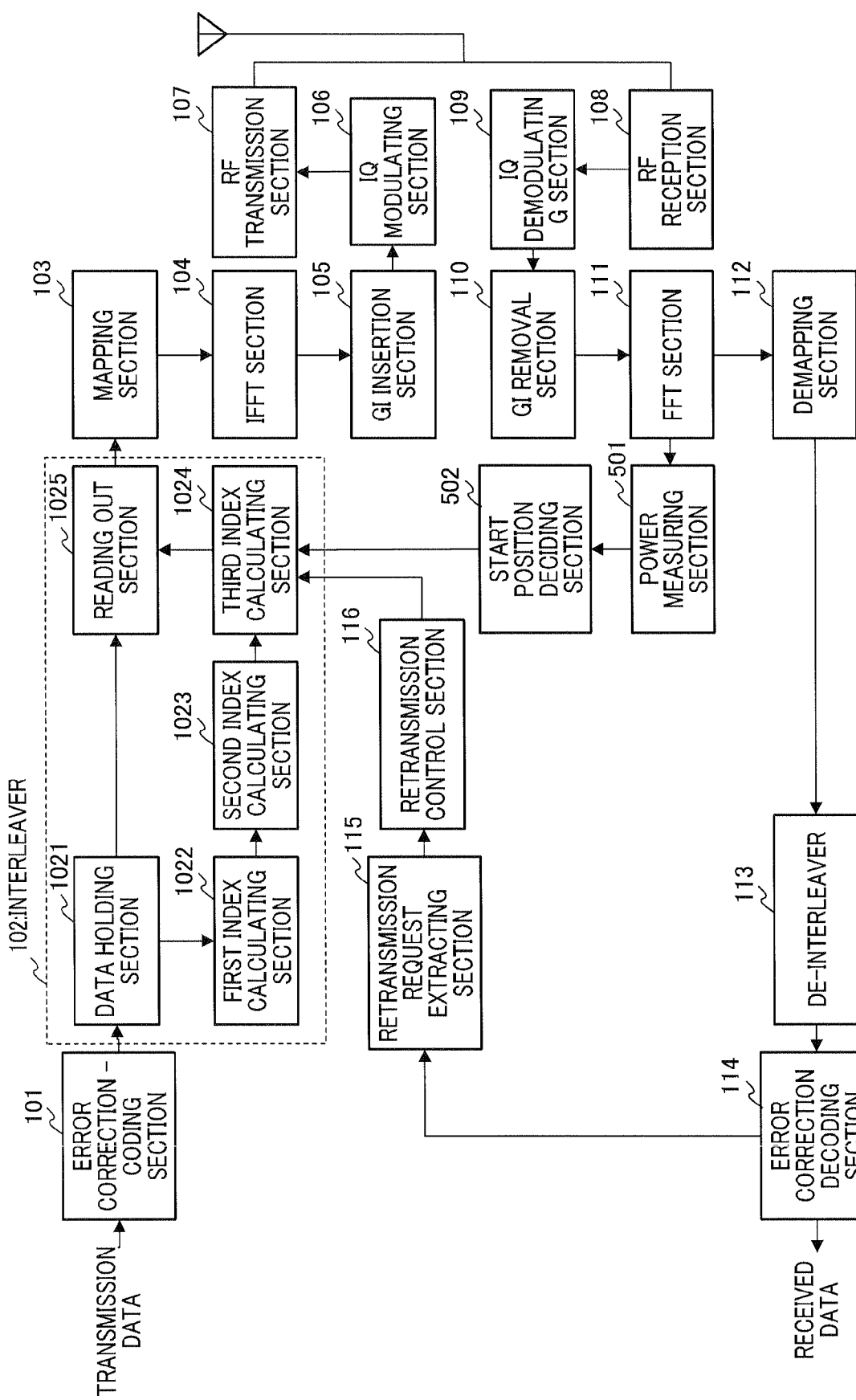
FIG. 9 is a block diagram showing a configuration of a radio transmission apparatus according to Embodiment 3 of the present invention.

FIG. 9 is a block diagram showing a configuration of the radio communication apparatus provided with the interleave apparatus according to an embodiment. In the same drawing, parts that are the same as those in FIG. 2 will be assigned the same reference numerals without further explanations. The radio communication apparatus shown in FIG. 9 has power measuring section 501 and start position deciding section 502 in addition to the radio communication apparatus in FIG. 2, and has third index calculating section 1024a in place of third index calculating section 1024 in FIG. 2.

Power measuring section 501 measures a power for each subcarrier in the process of fast Fourier transform performed by FFT section 111.

Start position deciding section 502 decides start position candidates of reading out for each retransmission bit streams held in data holding section 1021 based on a power measuring result of each subcarrier. Specifically, start position deciding section 502 decides start position candidates except positions of bits mapped to subcarriers where the power has fallen, and decides start position candidates so that specific bits such as bits of high importance are not mapped to subcarriers where the power has fallen.

Further, start position deciding section 502 may also decide start position candidates so that bits mapped to subcarriers with a low power are preferentially mapped to subcarriers with a high power at the next transmission based on the power measuring result. In this case, start position deciding section 502 decides start position candidates so that bits mapped to subcarriers with the lowest power are mapped to subcarriers with the highest power at the next transmission based on the power measuring result, and it is thereby possible to promote averaging of the error rate.

Third index calculating section 1024a selects different start positions from start positions decided by start position deciding section 502 according to the number of retransmissions and obtains third indexes corresponding to the selected start positions. Namely, third index calculating section 1024a takes the third index of the bit of the start position selected for each retransmission as "0" and obtains the third indexes in the same ascending order as for the second indexes without using the specific equations such as equation 3 described in Embodiment 1.

In this embodiment, when a power for each subcarrier is measured by power measuring section 501, and, as a result, the frequency-power characteristics as shown in, for example, FIG. 10A can be obtained, start position deciding section 502 decides two start position candidates where a bit of index "0" is mapped to subcarrier 601, and a bit of index "0" is mapped to subcarrier 602. Similarly, when frequency-power characteristics as shown in, for example, FIG. 10B can be obtained, start position deciding section 502 decides four start position candidates corresponding to subcarriers 603 to 606. Namely, start position deciding section 502 flexibly decides start position candidates and the number of start position candidates according to the power measurement result.

The decided start position candidates are reported to third index calculating section 1024, and the third indexes are obtained, but in this embodiment, different start position candidates are taken as start positions for each retransmission, and the third index for a bit of the start position is taken as "0". At this time, third index calculating section 1024 takes different start position candidates as start positions for each retransmission in a predetermined order, without using specific equations. The start positions are selected without using specific equations, so that start position deciding section 502 can decide start position candidates where the column intervals are irregular.

Further, in this embodiment, the start positions selected at third index calculating section 1024a are transmitted to the receiving side as report information. As a result, the receiving side can carry out accurate deinterleaving.

As described above, according to this embodiment, start positions of reading out bits are decided adaptively based on the power measuring result of each subcarrier, so that it is possible to prevent the same bits consecutively being mapped to subcarriers influenced by frequency selective fading. As a result, it is possible to further reliably prevent an increase in the number of retransmissions.

The interleave apparatus according to a first aspect of the present invention adopts a configuration having: a holding section that holds a bit stream which is comprised of a plurality of bits and written in a writing order where the plurality of bits are arranged in a two-dimensional array; a reading out section that reads out the plurality of bits from the held bit stream in an order different from the writing order; a transmission section that maps the read out plurality of bits to a plurality of carriers having different frequencies in the reading out order and transmits the bits; and a retransmission control section that counts the number of retransmissions requested for the transmitted plurality of bits, wherein the reading out section changes a start position of the reading out order according to the number of retransmissions.

According to this configuration, start positions in the order of reading out bit streams held in a two-dimensional array are changed for each retransmission, and the read out bits are mapped to a plurality of carriers and transmitted sequentially. Therefore, the same bits are mapped to different carriers for each retransmission, and the propagation characteristics of the carriers transmitting the bits change for each retransmission. As a result, it is possible to prevent an increase in the number of retransmissions and improve throughput.

The interleave apparatus according to a second aspect of the present invention adopt a configuration in the first aspect, wherein: the reading out section has an index calculating section that calculates indexes whose values become larger in the reading out order, for each of the plurality of bits; and the index calculating section calculates a minimum index for a bit at a start position of each number of retransmissions.

According to this configuration, indexes whose values become larger in an order of reading out from start positions of each number of retransmissions are calculated for each bit, and start positions therefore reliably changes for each number of retransmissions by reading out bits according to the indexes. Further, it is possible to decide the reading out order according to operation using mathematical expressions.

The interleave apparatus according to the third embodiment of the present invention adopt a configuration wherein, in the first aspect, the reading out section takes one of a plurality of start position candidates set at regular intervals in the two-dimensional array as a start position of each number of retransmissions.

According to this configuration, start positions are selected from start position candidates set at regular intervals, so that it is possible to decide start positions for each number of retransmissions by operation using the number of retransmissions.

The interleave apparatus according to a fourth aspect of the present invention adopts a configuration wherein, in the third aspect, the reading out section takes a start position candidate putting at least one start position candidate between the start position and a start position in the number of retransmissions for the previous time as a start position for the number of retransmissions for this time.

According to this configuration, in the consecutive numbers of retransmissions, start positions are selected so as to put at least one start position candidate, so that, in the consecutive numbers of retransmissions, the same bits are mapped to carriers whose frequencies are more distant from each other and it is therefore possible to obtain frequency diversity effects.

The interleave apparatus according to a fifth aspect of the present invention adopt a configuration in addition to the first aspect further having: a reception section that receives a multicarrier signal including the plurality of carriers; a measuring section that measures a power of each carrier using the received multicarrier signal; and a deciding section that decides a plurality of start position candidates according to the measured power of each carrier, wherein the reading out section takes one of the plurality of start position candidates as a start position of each number of retransmissions.

According to this configuration, start positions are selected for each number of retransmissions from start position candidates decided according to the power of each carrier, so that bits are always read out from optimum start positions decided according to changes in frequency selective fading characteristics, and it is therefore possible to further reliably prevent an increase in the number of retransmissions.

The interleave apparatus according to a sixth aspect of the present invention adopt a configuration wherein, in the fifth aspect, the deciding section decides start position candidates except positions of bits mapped to carriers with a power less than a predetermined level in the two-dimensional array.

According to this configuration, start position candidates are decided except the positions of bits mapped to carriers with a low power, so that it is possible to map bits for start positions to carriers that are not influenced by frequency selective fading in all the numbers of retransmissions.

The interleave apparatus according to a seventh aspect of the present invention adopts a configuration wherein, in the fifth aspect, the deciding section decides start position candidates so that, in the consecutive numbers of retransmissions, the same bits are not mapped to carriers having a power less than a predetermined level.

According to this configuration, the same bits are not mapped to low power carriers in two consecutive transmissions, so that the bits mapped to carriers with a low power are preferentially mapped to carriers of a high power at the next transmission, and it is therefore possible to further reliably prevent an increase in the number of retransmissions.

An interleave method according to an eighth aspect of the present invention has: a holding step of holding a bit stream which is comprised of a plurality of bits in a writing order where the plurality of bits are as arranged in a two-dimensional array; a reading out step of reading out the plurality of bits from the held bit stream in an order different from the writing order; a transmission step of mapping the read out plurality of bits to a plurality of carriers having different frequencies in the reading out order and transmitting the bits; and a retransmission control step of counting the number of retransmissions requested for the transmitted plurality of bits, wherein the reading out step changes a start position of the reading out order according to the number of retransmissions.

According to this method, start positions for the order of reading out bit streams held in a two-dimensional array change for each retransmission, and the read out bits are mapped to a plurality of carriers and transmitted sequentially. Therefore, the same bits are mapped to different carriers for each retransmission, and the propagation characteristics of the carriers transmitting each bit change for each retransmission. As a result, it is possible to prevent an increase in the number of retransmissions and improve throughput.

The present application is based on Japanese Patent Application No. 2004-369683, filed on Dec. 21, 2004, the entire content of which is expressly incorporated herein by reference.

INDUSTRIAL APPLICABILITY

The interleave apparatus and interleave method of the present invention are capable of preventing an increase in the number of retransmissions and improving throughput, and is suitable for use as an interleave apparatus and an interleave method for interleaving data multicarrier-transmitted by a plurality of carriers whose frequencies are different from each other.

The invention claimed is:
1. An interleave apparatus comprising:
a holding section that holds a bit stream comprising a plurality of bits, the bit stream being written in a writing order wherein the plurality of bits are arranged in a two-dimensional array;
a reading out section that reads out the plurality of bits from the held bit stream, in a reading out order different from the writing order;
a transmission section that maps the read out plurality of bits to a plurality of carriers having different frequencies, in the reading out order, and transmits the mapped plurality of bits; and
a retransmission control section that counts a number of retransmissions requested for the transmitted plurality of bits, wherein:
the reading out section comprises an index calculating section that calculates indexes whose values become larger in the reading out order, for each of the plurality of bits; and the index calculating section calculates a minimum index for a bit at a start position of each of the counted number of retransmissions.

2. An interleave method comprising:
holding a bit stream comprising a plurality of bits, the bit stream being and written in a writing order wherein the plurality of bits are arranged in a two-dimensional array;
reading out the plurality of bits from the held bit stream, in a reading out order different from the writing order;
mapping the read out plurality of bits to a plurality of carriers having different frequencies, in the reading out order;
transmitting the mapped plurality of bits; and
counting a number of retransmissions requested for the transmitted plurality of bits, wherein:
the reading out of the plurality of bits comprises calculating, indexes whose values become larger in the reading out order, for each of the plurality of bits; and
the calculating of the indexes comprises calculating a minimum index for a bit at a start position of each of the counted number of retransmissions.

* * * * *

UNITED STATES PATENT AND TRADEMARK OFFICE
CERTIFICATE OF CORRECTION

Page 1 of 1

PATENT NO. : 7,969,957 B2
APPLICATION NO. : 11/722144
DATED : June 28, 2011
INVENTOR(S) : Katsuyoshi Naka et al.

It is certified that error appears in the above-identified patent and that said Letters Patent is hereby corrected as shown below:

Claim 2, column 15, line 6, incorrectly reads:

"stream being and written in a writing order wherein the"

and should read:

"stream being written in a writing order wherein the"

Claim 2, column 16, line 5, incorrectly reads:

"ing, indexes whose values become larger in the reading"

and should read:

"ing indexes whose values become larger in the reading"

Signed and Sealed this
Sixth Day of March, 2012

David J. Kappos
*Director of the United States Patent and Trademark Office*